(12) United States Patent
Xu et al.

(10) Patent No.: US 9,725,986 B2
(45) Date of Patent: Aug. 8, 2017

(54) MULTI-FUNCTIONAL SURFACTANT COMPLEXES FOR USE IN SUBTERRANEAN FORMATIONS

(71) Applicant: Multi-Chem Group, LLC, San Angelo, TX (US)

(72) Inventors: Liang Xu, The Woodlands, TX (US); Jayant Rane, Kingwood, TX (US); Kai He, Kingwood, TX (US)

(73) Assignee: Multi-Chem Group, LLC, San Angelo, TX (US)

( * ) Notice: Subject to any disclaimer, the term of this patent is extended or adjusted under 35 U.S.C. 154(b) by 0 days.

(21) Appl. No.: 14/955,292

(22) Filed: Dec. 1, 2015

(65) Prior Publication Data

US 2016/0083639 A1 Mar. 24, 2016

Related U.S. Application Data

(63) Continuation-in-part of application No. PCT/US2014/049449, filed on Aug. 1, 2014.

(51) Int. Cl.
  *E21B 41/00* (2006.01)
  *C09K 8/68* (2006.01)
  (Continued)

(52) U.S. Cl.
  CPC .............. *E21B 41/00* (2013.01); *C09K 8/035* (2013.01); *C09K 8/602* (2013.01); *C09K 8/68* (2013.01);
  (Continued)

(58) Field of Classification Search
  CPC ........... E21B 41/00; E21B 43/26; C09K 8/88; C09K 8/86; C09K 8/035; C09K 8/68;
  (Continued)

(56) References Cited

U.S. PATENT DOCUMENTS 6,302,209 B1* 10/2001 Thompson, Sr. ... B01F 17/0028
                                          166/305.1
2002/0023752 A1* 2/2002 Qu ........................... C09K 8/68
                                          166/308.1

(Continued)

OTHER PUBLICATIONS

International Search Report and Written Opinion issued in related Application No. PCT/US2016/054775, mailed Jan. 24, 2017 (11 pages).

Examination Report issued in related Australian Application No. 2014402330, dated Apr. 13, 2017 (4 pages).

*Primary Examiner* — Silvana Runyan
(74) *Attorney, Agent, or Firm* — Tenley Krueger; Baker Botts L.L.P.

(57) ABSTRACT

Systems and methods for creating and/or using multi-functional surfactant complexes that may enhance surfactant treatments in subterranean formations are provided. In some embodiments, the methods comprise: providing a treatment fluid comprising an aqueous base fluid and one or more multi-functional surfactant complexes that comprise at least one surfactant and at least one polymeric additive, wherein the surfactant and the polymeric additive carry opposite charges; and introducing the treatment fluid into a well bore at a well site penetrating at least a portion of a subterranean formation.

13 Claims, 7 Drawing Sheets

(51) Int. Cl.
    *E21B 43/26*   (2006.01)
    *C09K 8/035*   (2006.01)
    *C09K 8/60*    (2006.01)
    *C09K 8/86*    (2006.01)
    *C09K 8/88*    (2006.01)

(52) U.S. Cl.
    CPC .......... *C09K 8/86* (2013.01); *C09K 8/88* (2013.01); *E21B 43/26* (2013.01); *C09K 2208/12* (2013.01); *C09K 2208/28* (2013.01); *C09K 2208/32* (2013.01)

(58) Field of Classification Search
    CPC ........... C09K 8/602; C09K 2208/12; C09K 2208/28; C09K 2208/32
    USPC ..................................... 166/308.2
    See application file for complete search history.

(56) References Cited

U.S. PATENT DOCUMENTS

| | | | |
|---|---|---|---|
| 2003/0158269 A1* | 8/2003 | Smith .................. | B08B 9/0555 516/98 |
| 2007/0144739 A1 | 6/2007 | Fitzgerald | |
| 2008/0139411 A1 | 6/2008 | Harris et al. | |
| 2011/0061855 A1 | 3/2011 | Case et al. | |
| 2012/0157356 A1* | 6/2012 | Dawson ................ | C09K 8/602 507/219 |
| 2012/0220503 A1 | 8/2012 | Sanchez Reyes et al. | |
| 2013/0032345 A1* | 2/2013 | Freese .................. | C09K 8/72 166/279 |
| 2013/0123149 A1 | 5/2013 | Berkland et al. | |

* cited by examiner

MULTI-FUNCTIONAL SURFACTANT COMPLEXES FOR USE IN SUBTERRANEAN FORMATIONS

CROSS-REFERENCE TO RELATED APPLICATIONS

This application claims priority to PCT Application Ser. No. PCT/US2014/49449 titled "Methods and Systems for Preparing Surfactant Polyelectrolyte Complexes for Use in Subterranean Formations" filed Aug. 1, 2014, the entire disclosure of which is incorporated by reference herein, and is continuation-in part thereof.

BACKGROUND

The present disclosure relates to systems and methods for treating subterranean formations using surfactants.

Treatment fluids can be used in a variety of subterranean treatment operations. As used herein, the terms "treat," "treatment," "treating," and grammatical equivalents thereof refer to any subterranean operation that uses a fluid in conjunction with achieving a desired function and/or for a desired purpose. Use of these terms does not imply any particular action by the treatment fluid. Illustrative treatment operations can include, for example, fracturing operations, gravel packing operations, acidizing operations, scale dissolution and removal, consolidation operations, and the like.

Many such treatment fluids include a variety of chemicals to treat common problems encountered in the subterranean formation and/or well bore. Commonly encountered problems include the production of scale producing compounds, wax buildup and corrosion. To solve this wide variety of problems, the oil industry has developed several categories of well treatment chemicals. A non-inclusive classification of well treatment chemicals includes: scale inhibitors, biocides, corrosion inhibitors, hydrogen sulfide scavengers, well tracing materials, de-waxing agents, clay stabilizers, and many others.

Surfactants are also widely used in treatment fluids for drilling operations and other well treatment operations, including hydraulic fracturing and acidizing (both fracture acidizing and matrix acidizing) treatments. Surfactants may also be used in enhanced or improved oil recovery operations. Many variables may affect the selection of a surfactant for use in such treatments and operations, such as interfacial surface tension, wettability, compatibility with other additives (such as other additives used in acidizing treatments), and emulsification tendency. Surfactants are often an important component in treatment fluids for ensuring higher productivity from unconventional oil and gas formations.

SUMMARY

The present disclosure relates to systems and methods for treating subterranean formations. More particularly, the present disclosure relates to systems and methods for creating and/or using multi-functional surfactant complexes that may enhance surfactant treatments in subterranean formations.

In certain embodiments, the present disclosure provides a method comprising: providing a first solution comprising at least one surfactant and a second solution comprising at least one polymeric additive, wherein the surfactant and the polymeric additive carry opposite charges; using a stop-flow mixing apparatus at a well site to mix the first and second solutions to form one or more multi-functional surfactant complexes that comprise the surfactant and the polymeric additive; using a low-dose pumping apparatus at the well site to transfer the one or more multi-functional surfactant complexes from the stop-flow mixing apparatus to a blending apparatus at the well site; using the blending apparatus to mix the one or more multi-functional surfactant complexes with an aqueous base fluid to form a treatment fluid; and introducing the treatment fluid into a well bore at the well site penetrating at least a portion of a subterranean formation.

In certain embodiments, the present disclosure provides a system for preparing multi-functional surfactant complexes at a well site comprising: a pump and blender system disposed at a surface of a well bore penetrating at least a portion of a subterranean formation; a stop-flow mixing apparatus having at least a first inlet for receiving a solution comprising a surfactant, a second inlet for receiving a solution comprising a polymeric additive, and an outlet through which a solution comprising one or more multi-functional surfactant complexes flows out of the stop-flow mixing apparatus; a low-dose pumping apparatus coupled between the outlet of the stop-flow mixing apparatus and an inlet of the pump and blender system; and a base fluid source coupled to an inlet of the pump and blender system.

In certain embodiments, the present disclosure provides a method comprising: providing a treatment fluid comprising an aqueous base fluid and one or more multi-functional surfactant complexes that comprise at least one surfactant and at least one polymeric additive, wherein the surfactant and the polymeric additive carry opposite charges; and introducing the treatment fluid into a well bore at a well site penetrating at least a portion of a subterranean formation.

The features and advantages of the present disclosure will be readily apparent to those skilled in the art. While numerous changes may be made by those skilled in the art, such changes are within the spirit of the disclosure and claims.

BRIEF DESCRIPTION OF THE DRAWINGS

These drawings illustrate certain aspects of some of the embodiments of the present disclosure, and should not be used to limit or define the claims.

Figure 1:
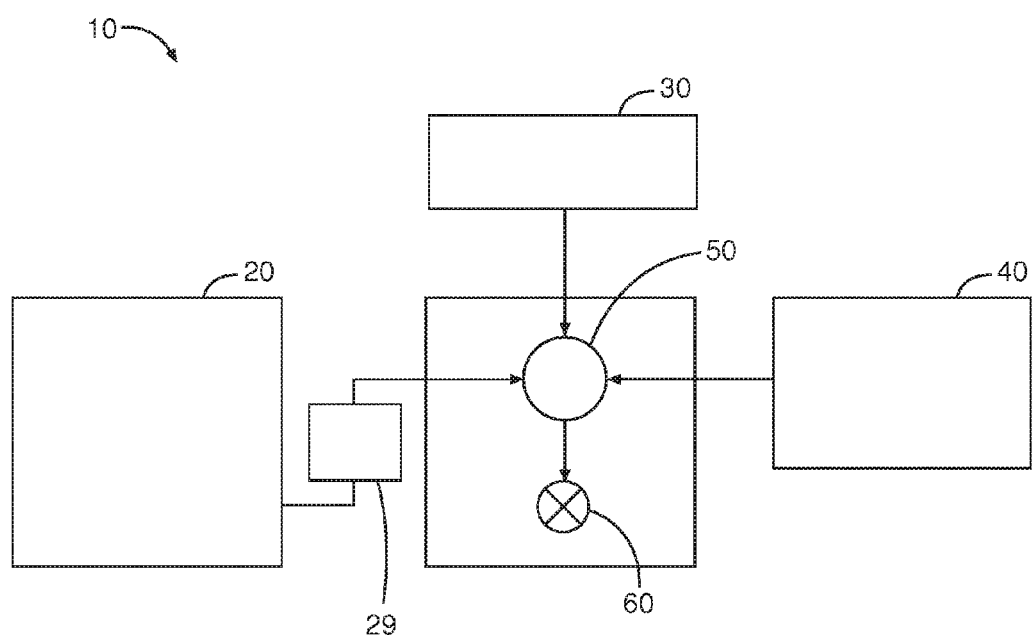
FIG. 1 is a diagram illustrating an example of a well treatment system that may be used in accordance with certain embodiments of the present disclosure.

While embodiments of this disclosure have been depicted, such embodiments do not imply a limitation on the disclosure, and no such limitation should be inferred. The subject matter disclosed is capable of considerable modification, alteration, and equivalents in form and function, as will occur to those skilled in the pertinent art and having the benefit of this disclosure. The depicted and described embodiments of this disclosure are examples only, and not exhaustive of the scope of the disclosure.

DESCRIPTION OF EMBODIMENTS

The present disclosure relates to systems and methods for treating subterranean formations. More particularly, the present disclosure relates to systems and methods for creating and/or using multi-functional surfactant complexes that may enhance surfactant treatments in subterranean formations.

The present disclosure provides methods and systems for creating and/or using multi-functional surfactant complexes (MSCs) for use in subterranean formations and subterranean wells penetrating such formations. The MSCs of the present disclosure generally comprise a complex of surfactant molecules and molecules of an oppositely-charged polymeric additive, such as a friction reducer, a clay stabilizer, a biocide, a corrosion inhibitor, a scale inhibitor, or any combination thereof associated with one another via a non-covalent (e.g., ionic) interaction. In certain embodiments, the multi-functional surfactant complexes of the present disclosure may be prepared by adding a surfactant and polymeric additive carrying opposite electrostatic charges to a stop-flow mixing apparatus and mixed at an appropriate speed to form one or more MSCs. The mixture is then transferred to a blender at a well site using a low-dose pumping apparatus. The blender then mixes the MSCs into a base fluid (and, optionally, additional additives) to prepare a treatment fluid that may be introduced into at least a portion of a subterranean formation. In certain embodiments, one or more of the aforementioned steps may be performed at a well site, for example, substantially in or near real-time with the treatment and/or operation in which the MSCs are used. The treatment fluids of the present disclosure thus may comprise an aqueous base fluid and one or more multi-functional surfactant complexes. In certain embodiments, the treatment fluid is a fracturing fluid. However, the teachings of the present disclosure may be used in other treatment or subterranean fluids, including but not limited to, acidizing fluids and drilling fluids.

Without limiting the disclosure to any particular theory or mechanism, the electrostatic attraction between the oppositely charged surfactant and polymeric additive may drive the two molecules to form multi-functional surfactant complexes (MSCs). It is believed that the MSC is kinetically stable and that surfactant molecules may be temporarily trapped by the oppositely-charged polymeric additive. This in turn may minimize any interactions between the surfactant/polymeric additive and other components or additives in a treatment fluid (e.g., proppants) and/or the formation (e.g., charged rock surfaces in the formation) as the additives are pumped downhole. Thus, the surfactant and/or polymeric additive may be pumped deeper into the reservoir, at which point the MSCs may be disassembled or inverted through a variety of mechanisms to release the surfactant molecules and the polymeric additive. For example, phase equilibrium of MSC may be associated with the salinity of its environment; therefore, change of salinity could lead to disassembly of the aggregates. Temperature gradients and/or pH changes may also break up the MSCs and release the surfactant molecules and polymeric additive.

Among the many potential advantages to the methods and compositions of the present disclosure, only some of which are alluded to herein, the methods, compositions, and systems of the present disclosure may enhance the performance of surfactants and/or polymeric treatment additives by providing them in a manner that allows for synergistic interactions (e.g., delayed release) between the molecules of those components. In some embodiments, the methods and systems of the present disclosure may increase the penetration depth of certain treatment fluids, enabling the treatment of deep and/or dead-end pores in certain rock or formations where conventional treatments may not have been able to deliver surfactants and/or other additives as effectively. The methods and systems of the present disclosure also may provide a means of preparing MSCs for use at a well site immediately or soon after their preparation, which may allow operators to use MSCs in well treatments without the need to transport them to the well site and before they degrade or become unstable. In certain embodiments, the MSCs and/or the surfactants therein may be used in emulsions to enhance and/or prolong their stability. In certain embodiments, the MSCs may alter the bulk viscoelastic properties of the fluid and/or may induce turbulent flow therein. These viscoelastic properties may be tailored, among other reasons, to engineer flow that increases the contact of a treatment fluid of the present disclosure with oil globules in a subterranean formation (thereby enhancing oil recovery) and/or divert treatment fluids into deeper pores in a subterranean formation. In certain embodiments, charged MSCs may create electric fields in pore spaces in a formation that may act as "micropumps" that enhance diffusiooemotic flow in those pores.

The surfactant in the MSCs may comprise any surfactant (or blend of multiple surfactants) known in the art. In some embodiments the surfactant may be anionic, while in other embodiments it may be cationic, or in yet other embodiments, amphoteric, zwitterionic, or non-ionic, respectively. In some embodiments, the desired ionization, if any, of the surfactant may be determined based at least in part upon one or more characteristics of the oil and/or gas of a subterranean formation. For example, the charge of a surfactant of some embodiments of the treatment fluid may allow the surfactant to induce pair interactions (e.g., electrostatic interactions) with one or more molecules of oil and/or gas in the subterranean formation.

Thus, where the oil and/or gas of a subterranean formation contains predominantly alkaline compounds, which are typically positively charged in nature, the surfactant of some embodiments of the present disclosure may be anionic to allow the surfactant to induce electrostatic pair interactions with positively-charged oil and/or gas molecules. In some instances, the oil and/or gas of a subterranean formation may contain a mixture of alkaline and acidic compounds. In such a circumstance, it may be advantageous to use an amphoteric and/or zwitterionic surfactant according to some embodiments of the present disclosure. Furthermore, the amphoteric and/or zwitterionic surfactants of some embodiments may exhibit different charge and/or reactivity at different ranges of pH. For instance, some surfactants that are amphoteric and/or zwitterionic at pH less than about 2 may become anionic, cationic, or non-ionic at pH greater than about 2. Because the downhole pH may change during acidization (for example, pH may rise from levels of from about 0-1 to about 4, as the acid is spent), the characteristics of surfactants of some embodiments may change during the process of an acidization treatment. Other characteristics of oil and/or gas within the formation that might affect the determination of desired surfactant charge include, but are not limited to: weight percentages of saturates, aromatics, resins and asphaltenes.

Examples of anionic surfactants that may be suitable in certain embodiments may include, but are not limited to: sodium, potassium, and ammonium salts of long chain alkyl sulfonates and alkyl aryl sulfonates (such as sodium dodecylbenzene sulfonate); dialkyl sodium sulfosuccinates (such as sodium dodecylbenzene sulfonate or sodium bis-(2-ethylthioxyl)-sulfosuccinate); alkyl sulfates (such as sodium lauryl sulfate); alkyl sulfonates (such as methyl sulfonate, heptyl sulfonate, decylbenzene sulfonate, dodecylbenzene sulfonate); and alkoxylated sulfates. Certain embodiments of the present disclosure may include a combination of anionic surfactants. Examples of non-ionic surfactants that may be suitable in certain embodiments may include, but are not limited to: ethoxylated alcohols and polyglucosides. In some embodiments, non-ionic surfactants may include ethoxylated long-chain alcohols (e.g., ethoxylated dodecanol). Ethoxylation may take place at any point along the alcohol. Examples of cationic surfactants that may be suitable in certain embodiments may include, but are not limited to: alkyl ammonium bromides. In some embodiments, the alkyl chain of the alkyl ammonium bromide may be anywhere from 1 to 50 carbons long, and be branched or un-branched. Thus, an example embodiment may include an alkyl ammonium bromide that comprises a 16-carbon chain alkyl component (e.g., cetyl trimethyl ammonium bromide). Examples of amphoteric and/or zwitterionic surfactants that may be suitable in certain embodiments may include, but are not limited to, hydroxysultaines (e.g., cocoamidopropyl hydroxysultaine, lauramidopropyl hydroxysultaine, lauryl hydroxysultaine, etc.).

The polymeric additive in the MSCs of the present disclosure may comprise any any treatment additive (or blend of multiple additives) known in the art that carries a charge opposite that of the surfactant and is capable of performing a particular treatment or function in a well bore or subterranean formation. Examples of additives that may be suitable in certain embodiments of the present disclosure include, but are not limited to, friction reducers, clay stabilizers, biocides, corrosion inhibitors, scale inhibitors, and any combination thereof. Examples of polymeric clay stabilizers that may be used to form MSCs of the present disclosure include, but are not limited to poly diallyldimethylammonium chloride (DADMAC), polyacrylamide-co-diallydimetylammonium chloride (AMD1 and AMD2), polyacrylic acid-co-diallydimethylammonium chloride (AAD), and dodecyltrimethylammonium bromide (DDAB). In certain embodiments, multiple different polymeric additives may be used to form MSCs with a single surfactant and/or with multiple different surfactants. In certain embodiments, MSCs comprising different polymeric additives may be formed separately and combined in a single treatment fluid.

In certain embodiments, the polymeric additives and/or surfactants may be mixed in any amount and/or concentration that causes them to form one or more MSCs. In certain embodiments, the relative concentrations of polymeric additive and surfactant may be varied, among other reasons, to control the size and/or number of the MSCs formed, to make the MSCs more stable, to increase the reaction rate, and other factors. For example, in certain embodiments, the number of MSCs may be increased by increasing the concentration of the polymeric additive relative to the concentration of the surfactant. A person of skill in the art with the benefit of this disclosure will recognize how to vary the amounts and/or concentrations of the polymeric additives and/or surfactants to produce MSCs having the desired properties.

In certain embodiments, the polymeric additives and/or surfactants may be provided in solutions prior to mixing, for example, using the stop-flow mixing apparatus to form the MSCs. The treatment fluids of some embodiments may be aqueous or organic. In certain embodiments, water may be used as a solvent for hydrophilic polymeric additives. In other embodiments, organic solvents may be used as a solvent for hydrophobic polymeric additives. Examples of organic solvents that may be suitable for certain embodiments include, but are not limited to, methanol, ethanol, ethylene glycol, xylene, toluene, aromatics, butyl glycol, and any combination thereof. In certain embodiments, the solutions comprising the polymeric additive or the surfactant, or the solutions or treatment fluids comprising the MSCs, may further comprise one or more salts, among other reasons, to facilitate the formation and/or maintenance of the MSCs. In these embodiments, any salt known in the art (e.g., NaCl) may be used.

The methods and systems of the present disclosure may be used to form compositions (e.g., treatment fluids) that may be used to treat a portion of a subterranean formation. The treatment fluids of the present disclosure generally comprise an aqueous base fluid and one or more MSCs. The aqueous base fluid used in some embodiments of the treatment fluids of the present disclosure may comprise fresh water, saltwater (e.g., water containing one or more salts dissolved therein), brine (e.g., saturated saltwater), seawater, or any combination thereof. Generally, the water may be from any source, provided that it does not contain components that might adversely affect the stability of the treatment fluids of the present disclosure. One of ordinary skill in the art, with the benefit of this disclosure, will recognize what components might adversely affect the stability and/or performance of the treatment fluids of the present disclosure.

In forming a treatment fluid comprising MSCs of the present disclosure, the MSCs may be included in an amount sufficient to release a sufficient amount of surfactant and polymeric additive to perform the desired treatment in the subterranean formation (e.g., to form one or more relatively short-lived oil-in-acid or oil-in-water emulsions within a subterranean formation). For example, in some embodiments, sufficient MSCs may be included in the treatment fluid to release an amount of surfactant of from about 0.1 to 50 gallons of surfactant per thousand gallons of acid, water, and/or other aqueous base fluid ("gpt"), or put another way, approximately 100 to 50,000 ppm. In other example embodiments, sufficient MSCs may be included in the treatment fluid to release an amount of surfactant of from about 2 to 40 gpt (approximately 2,000 ppm to 40,000 ppm), or in other embodiments, from about 3 to 25 gpt (approximately 3,000 ppm to about 25,000 ppm). In some embodiments, sufficient MSCs may be included in the treatment fluid to release an amount of surfactant of from about 4 gpt to about 18 gpt (approximately 4,000 ppm to 18,000 ppm).

The treatment fluids of the present disclosure may optionally include other components such as acids, salts, solvents, particulates, or other compounds as long as these components do not interfere with the surfactant or the ability of the polymeric additive to delay release of the surfactant. A person of skill in the art with the benefit of this disclosure would be able to select the appropriate other components depending on the desired treatment fluid. For example, the person of skill in the art might include an acid if it is desired to produce an acidizing treatment fluid. A person of skill in the art might also include particulates if it is desired to produce a fracturing fluid with proppant particles.

The treatment fluids of some embodiments may include solvents, such as methanol, ethanol, ethylene glycol, xylene, toluene, aromatics, or butyl glycol. Thus, for example, a treatment fluid of some embodiments may include ethylene glycol mono-butyl ether. The treatment fluids of some embodiments may further include salts, among other reasons, to stabilize the MSCs.

The treatment fluids of some embodiments may further comprise additional surfactants (e.g., in addition to the surfactants provided in the MSCs), among other reasons, to lower the surface tension or capillary pressure of the treatment fluid and allow the fluid to penetrate deeper into a formation or fracture therein. In certain embodiments, the additional surfactant may be included in the treatment fluid in a concentration greater than the critical micelle concentration (CMC) of that surfactant in the fluid.

The treatment fluids of some embodiments may include particulates (such as proppant particulates or gravel particulates) suitable for use in subterranean applications. Particulates suitable for use in the present disclosure may comprise any material suitable for use in subterranean operations. Proppant particulates may be used in conjunction with hydraulic fracturing to prevent the fractures from fully closing upon the release of hydraulic pressure, forming conductive channels through which fluids may flow to the wellbore. Suitable particulate materials include, but are not limited to, sand, bauxite, ceramic materials, glass materials, polymer materials, Teflon® materials, nut shell pieces, cured resinous particulates comprising nut shell pieces, seed shell pieces, cured resinous particulates comprising seed shell pieces, fruit pit pieces, cured resinous particulates comprising fruit pit pieces, wood, composite particulates, and any combination thereof. Suitable composite particulates may comprise a binder and a filler material wherein suitable filler materials include silica, alumina, fumed carbon, carbon black, graphite, mica, titanium dioxide, meta-silicate, calcium silicate, kaolin, talc, zirconia, boron, fly ash, hollow glass microspheres, solid glass, and any combination thereof. The particulate size generally may range from about 2 mesh to about 400 mesh on the U.S. Sieve Series; however, in certain circumstances, other sizes may be desired and will be entirely suitable for practice of the present disclosures. In particular embodiments, preferred particulates size distribution ranges are one or more of 6/12, 8/16, 12/20, 16/30, 20/40, 30/50, 40/60, 40/70, or 50/70 mesh. It should be understood that the term "particulate," as used in this disclosure, includes all known shapes of materials, including substantially spherical materials, fibrous materials, polygonal materials (such as cubic materials), and mixtures thereof. Moreover, fibrous materials, that may or may not be used to bear the pressure of a closed fracture, are often included in fracturing and sand control treatments. In certain embodiments, the particulates included in the treatment fluids of some embodiments of the present disclosure may be coated with any suitable resin or tackifying agent known to those of ordinary skill in the art.

The treatment fluids of some embodiments may additionally or instead include one or more of a variety of well-known additives (in addition to the polymeric additives included in the MSCs), such as gel stabilizers, fluid loss control additives, scale inhibitors, organic corrosion inhibitors, catalysts, clay stabilizers, biocides, bactericides, friction reducers, gases, foaming agents, iron control agents, solubilizers, pH adjusting agents (e.g., buffers), and the like. Those of ordinary skill in the art, with the benefit of this disclosure, will be able to determine the appropriate additives for a particular application.

The MSCs and the treatment fluids of the present disclosure may be prepared at a well site or at an offsite location. In certain embodiments, a base fluid may be mixed with a viscosifying agent first, among other reasons, in order to allow the viscosifying agent to hydrate. Then, proppants, MSCs, and/or other additives may be mixed into the viscosified fluid. Once prepared, a treatment fluid of the present disclosure may be placed in a tank, bin, or other container for storage and/or transport to the site where it is to be used. In other embodiments, a treatment fluid of the present disclosure may be prepared on-site, for example, using continuous mixing or "on-the-fly" methods, as described below.

The present disclosure in some embodiments provides methods for using the treatment fluids to carry out a variety of subterranean treatments, including but not limited to, hydraulic fracturing treatments, enhanced oil recovery treatments (e.g., water flooding treatments, polymer flooding treatments, etc.), acidizing treatments, and drilling operations. In some embodiments, the treatment fluids of the present disclosure may be used in treating a portion of a subterranean formation, for example, in acidizing treatments such as matrix acidizing or fracture acidizing. In certain embodiments, a treatment fluid may be introduced into a subterranean formation. In some embodiments, the treatment fluid may be introduced into a well bore that penetrates a subterranean formation. In some embodiments, the treatment fluid may be introduced at a pressure sufficient to create or enhance one or more fractures within the subterranean formation (e.g., hydraulic fracturing).

In some embodiments, the treatment fluid further comprising an acid may be introduced at a pressure sufficient to cause at least a portion of the treatment fluid to penetrate at least a portion of the subterranean formation, and the treatment fluid may be allowed to interact with the subterranean formation so as to create one or more voids in the subterranean formation (for example, in acidizing treatments). Introduction of the treatment fluid may in some of these embodiments be carried out at or above a pressure sufficient to create or enhance one or more fractures within the subterranean formation (e.g., fracture acidizing). In other embodiments, introduction of the treatment fluid may be carried out at a pressure below that which would create or enhance one or more fractures within the subterranean formation (e.g., matrix acidizing).

Figure 2:
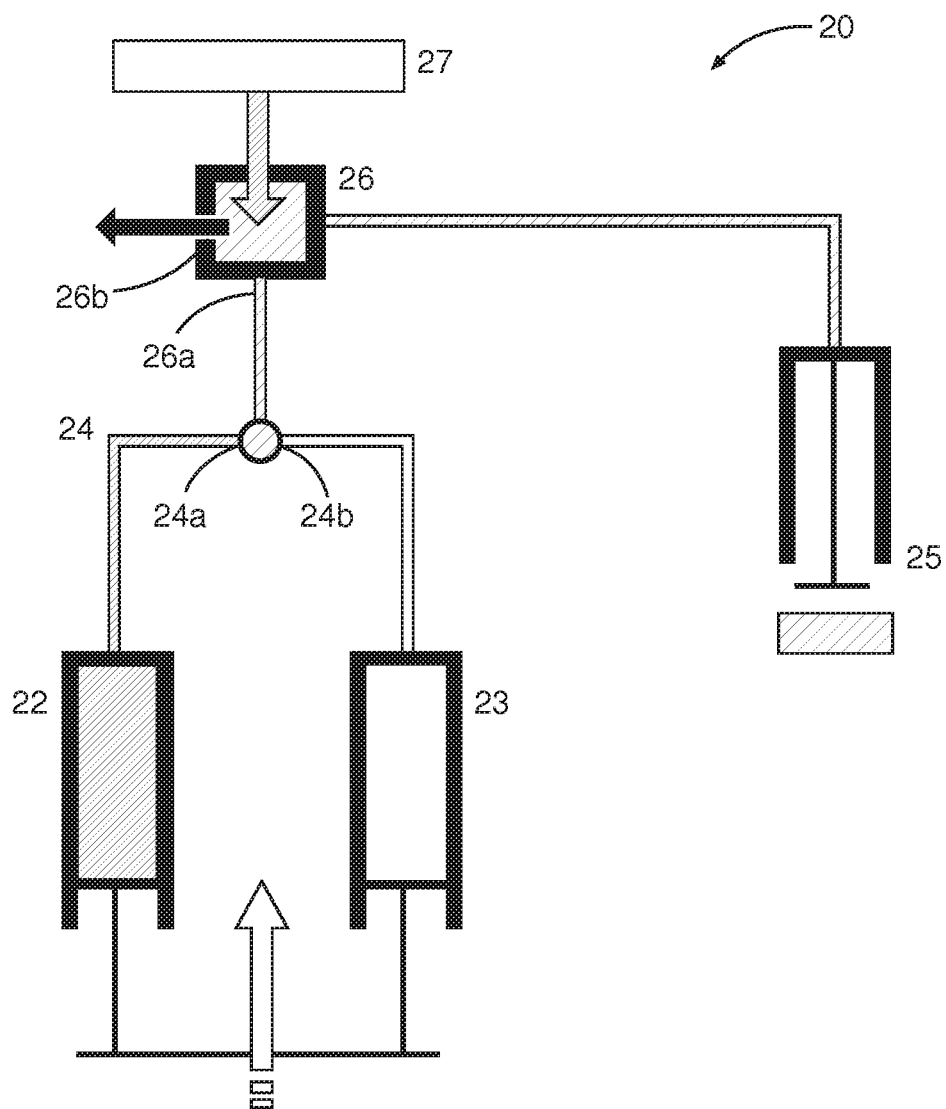
FIG. 2 is a diagram illustrating a stop-flow mixing apparatus that may be used in accordance with certain embodiments of the present disclosure.

Referring now to FIG. 1, an example of a well bore treatment system 10 is illustrated according to certain embodiments of the present disclosure. System 10 includes a stop-flow mixing apparatus 20, a low-dose pumping apparatus 29, a base fluid source 30, a proppant source 40, and a pump and blender system 50, and is disposed at the surface at a well site where a well 60 is located. System 10 may be used to prepare MSCs and/or treatment fluids according to the present disclosure and to introduce those fluids into well 60. The various apparatus in system 10 may be provided at the well site as separate components or equipment, or may be integrated in a single unitary system such as a fracturing blender vehicle. The stop-flow mixing apparatus 20 according to some embodiments is illustrated in further detail in FIG. 2. In certain embodiments, stop-flow mixing apparatus 20 may include similar components to that of laboratory stop-flow mixing apparatuses that are constructed at appropriate scales and with appropriate materials for a well site application. Referring now to FIG. 2, stop-flow mixing apparatus 20 includes at least two syringes 22 and 23 that inject fluids (e.g., solutions comprising surfactant or polymeric additive) into one or more inlets 24 a and 24 b in mixer 24. Mixer 24 may comprise any mixer, homogenizer, or dispersion device that provides sufficient shear to mix relatively small volumes of fluids, including but not limited to high energy mixing devices and ultrasonic dispersion devices. The mixer includes an outlet 24 c through which fluid may flow to an observation cell 26 (through its inlet 26 a) and stopping syringe 25. In certain embodiments, as the solutions comprising the surfactant and polymeric additive are pushed from syringes 22 and 23, respectively, and through mixer 24, the molecules of the surfactant and polymeric additive associate to form MSCs. Fluid comprising the MSCs then flows into observation cell 26 and stopping syringe 25 until stopping syringe 25 reaches a predetermined volume (e.g., when the reaction reaches a continuous flow rate). At that volume, the plunger on stopping syringe will stop the flow of liquids through the apparatus 20. Apparatus 20 also includes a measurement device 27 that is configured to monitor the contents of the observation cell 26 using one or more known analytical methods (e.g., UV-visible spectroscopy, FTIR spectroscopy, etc.) and equipment. This device may be used, among other purposes to confirm the formation of MSCs for use in the treatment fluid. The fluid in observation cell 26 then flows out of the stop-flow mixing apparatus 20 through outlet 26 b. In certain embodiments, the stop-flow mixing apparatus illustrated in FIG. 2 (or another suitable device for forming MSCs of the present disclosure) may be located and operated at a location other than a well site, and the MSCs formed using that apparatus may be transported to a well site for use.

Referring back to FIG. 1, fluids comprising MSCs flow out of stop-flow mixing apparatus 20, and are then metered into pump and blender system 50 using a low-dose pumping apparatus 29 coupled between stop-flow mixing apparatus 20 and an inlet of pump and blender system 50. The low-dose pumping apparatus 29 may comprise any liquid dosing or metering pump known in the art that is capable of pumping liquids therethrough in very low concentrations (e.g., less than about 1 gallon per thousand gallons of fluid (gpt), or in some cases, less than about 0.1 gpt). Examples of such devices are pumps equipped with the Micro Motion® meters and measurement devices available from Emerson Process Management.

The proppant source 40 can include a proppant for combination with the fracturing fluid. The pump and blender system 50 receives the base fluid (and any additives pre-mixed into that fluid) from fluid source 30 and combines it with other components, including proppant from the proppant source 40. System 10 optionally may include other tanks, hoppers, or pumps (not shown) that are equipped to dispense additional fluids and/or additives into pump and blender system 50. The resulting mixture may be pumped down the well 60, for example, under a pressure sufficient to create or enhance one or more fractures in a subterranean zone, for example, to stimulate production of fluids from the zone. Notably, in certain instances, stop-flow mixing apparatus 20, base fluid source 30, and/or proppant source 40 may be equipped with one or more metering devices (not shown) to control the flow of fluids, proppants, and/or other compositions to the pump and blender system 50. Such metering devices may permit the pump and blender system 50 can source from one, some or all of the different sources at a given time, and may facilitate the preparation of treatment fluids in accordance with the present disclosure using continuous mixing or "on-the-fly" methods.

Figure 3:
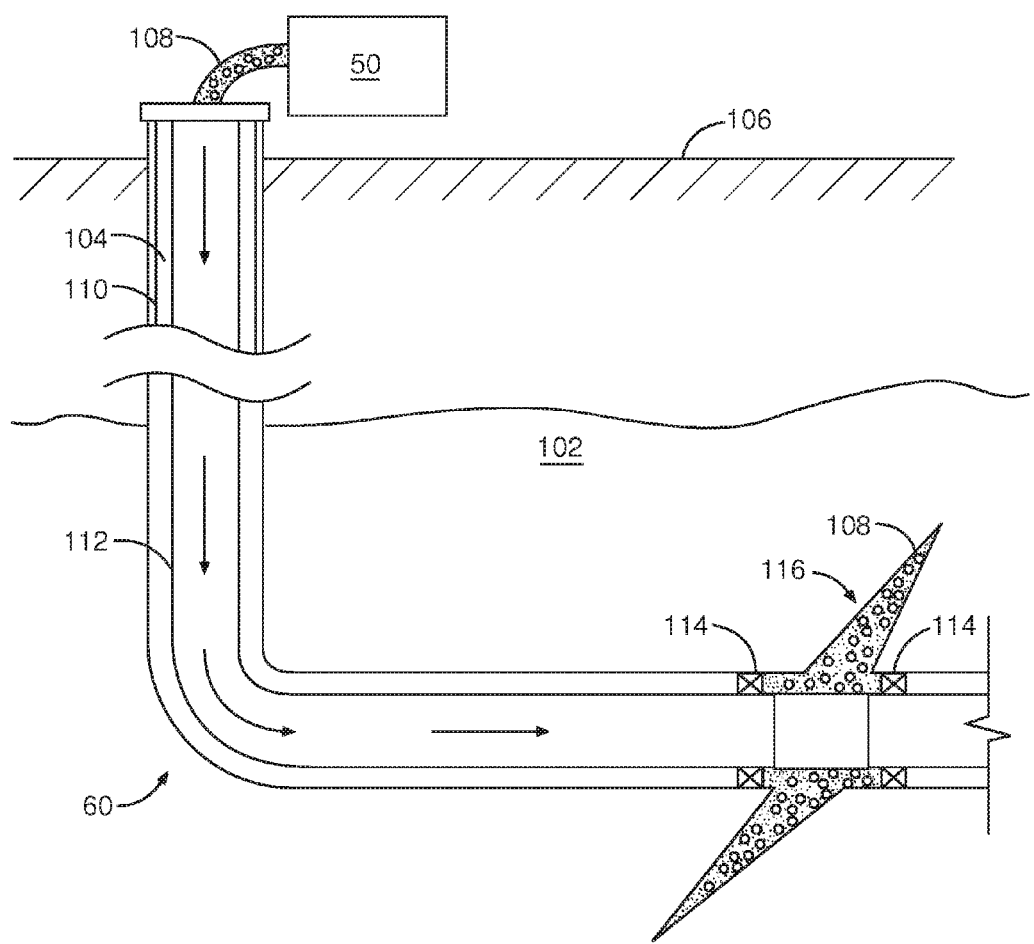
FIG. 3 is a diagram illustrating an example of a subterranean formation in which a fracturing operation may be performed in accordance with certain embodiments of the present disclosure.

FIG. 3 shows the well 60 and treatment system 10 during a fracturing operation in a portion of a subterranean formation of interest 102 surrounding a well bore 104. The well bore 104 extends from the surface 106, and the fracturing fluid 108 is applied to a portion of the subterranean formation 102 surrounding the horizontal portion of the well bore. Although shown as vertical deviating to horizontal, the well bore 104 may include horizontal, vertical, slant, curved, and other types of well bore geometries and orientations, and the fracturing treatment may be applied to a subterranean zone surrounding any portion of the well bore. The well bore 104 can include a casing 110 that is cemented or otherwise secured to the well bore wall. The well bore 104 can be uncased or include uncased sections. Perforations can be formed in the casing 110 to allow fracturing fluids and/or other materials to flow into the subterranean formation 102. In cased wells, perforations can be formed using shape charges, a perforating gun, hydro-jetting and/or other tools.

The well is shown with a work string 112 depending from the surface 106 into the well bore 104. The pump and blender system 50 is coupled a work string 112 to pump the fracturing fluid 108 into the well bore 104. The working string 112 may include coiled tubing, jointed pipe, and/or other structures that allow fluid to flow into the well bore 104. The working string 112 can include flow control devices, bypass valves, ports, and or other tools or well devices that control a flow of fluid from the interior of the working string 112 into the subterranean zone 102. For example, the working string 112 may include ports adjacent the well bore wall to communicate the fracturing fluid 108 directly into the subterranean formation 102, and/or the working string 112 may include ports that are spaced apart from the well bore wall to communicate the fracturing fluid 108 into an annulus in the well bore between the working string 112 and the well bore wall.

The working string 112 and/or the well bore 104 may include one or more sets of packers 114 that seal the annulus between the working string 112 and well bore 104 to define an interval of the well bore 104 into which the fracturing fluid 108 will be pumped. FIG. 3 shows two packers 114, one defining an uphole boundary of the interval and one defining the downhole end of the interval. When the fracturing fluid 108 is introduced into well bore 104 (e.g., in FIG. 3, the area of the well bore 104 between packers 114) at a sufficient hydraulic pressure, one or more fractures 116 may be created in the subterranean zone 102. The proppant particulates in the fracturing fluid 108 may enter the fractures 116 where they may remain after the fracturing fluid flows out of the well bore. These proppant particulates may "prop" fractures 116 such that fluids may flow more freely through the fractures 116.

While not specifically illustrated herein, the disclosed methods and compositions may also directly or indirectly affect any transport or delivery equipment used to convey the compositions to the fracturing system 10 such as, for example, any transport vessels, conduits, pipelines, trucks, tubulars, and/or pipes used to fluidically move the compositions from one location to another, any pumps, compressors, or motors used to drive the compositions into motion, any valves or related joints used to regulate the pressure or flow rate of the compositions, and any sensors (i.e., pressure and temperature), gauges, and/or combinations thereof, and the like.

To facilitate a better understanding of the present disclosure, the following examples of certain aspects of preferred embodiments are given. The following examples are not the only examples that could be given according to the present disclosure and are not intended to limit the scope of the disclosure or claims.

EXAMPLES

Example 1A

Figure 4:
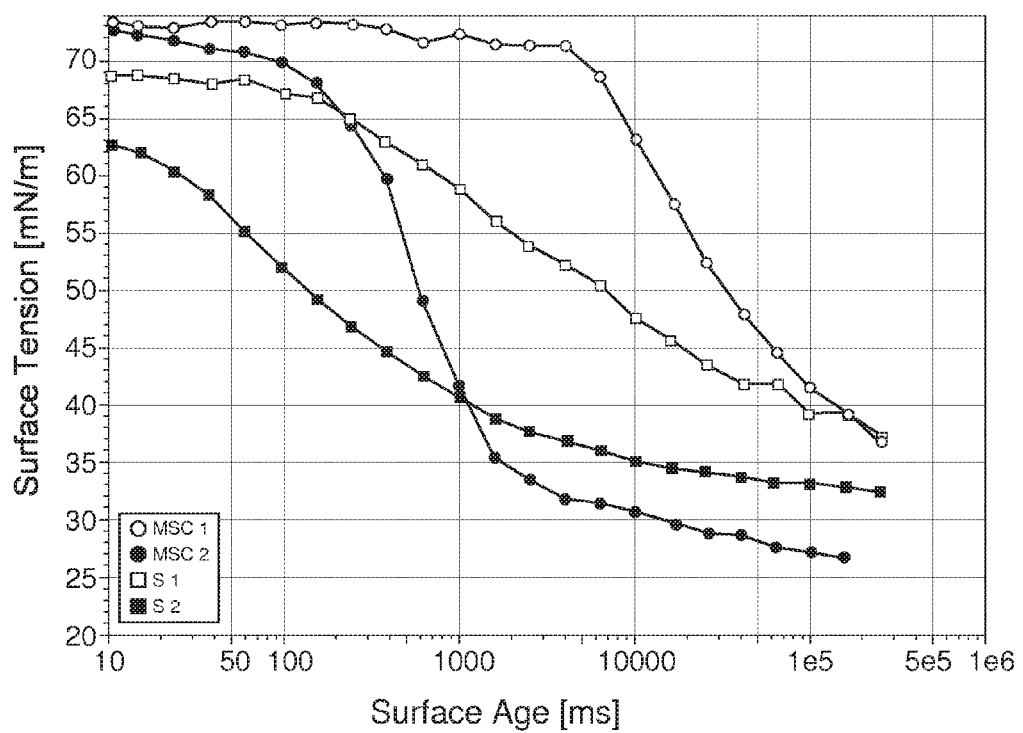
FIG. 4 is a graph illustrating dynamic surface tension data of certain solutions according to embodiments of the present disclosure.

Dynamic surface tension tests were performed to determine how the MSCs of the present disclosure impact the surface tension of the associated surfactants at the air-water interface. In these tests, tensiometer was used to determine the requisite pressure of a gas (air) pumped into a capillary needle projecting into a solution of the surfactant/MSC's of the present disclosure to create a bubble in the solution. Using the maximum bubble pressure method, the pressure needed to form a bubble is measured and the surface tension of the sample is calculated from the pressure difference between inside and outside the bubble and the radius of the bubble. Aqueous solutions of two different anionic surfactants were tested in this manner, both in samples with the surfactants alone (samples S1 and S2) and samples with the surfactants associated with multi-functional surfactant complexes (samples MSC1 and MSC2). The surfactant in samples S1 and MSC1 comprised a DDBSA anionic surfactant, and the surfactant in samples S2 and MSC2 comprised a blend of DDBSA and ethoxylated surfactants. In samples MSC1 and MSC2, a polyethylenemine cationic polymer was used to form the multi-functional surfactant complexes. FIG. 4 is a dynamic surface tension plot illustrating this data over time. As shown in FIG. 4, the dynamic surface tension of the solutions containing MSCs maintained a high surface tension for a longer period of time and initially decreased less rapidly than the corresponding solutions of those surfactants alone. The rate of decrease in the surface tension corresponds to the diffusion of the surfactant to the air-water surface.

Example 1B

Figure 5:
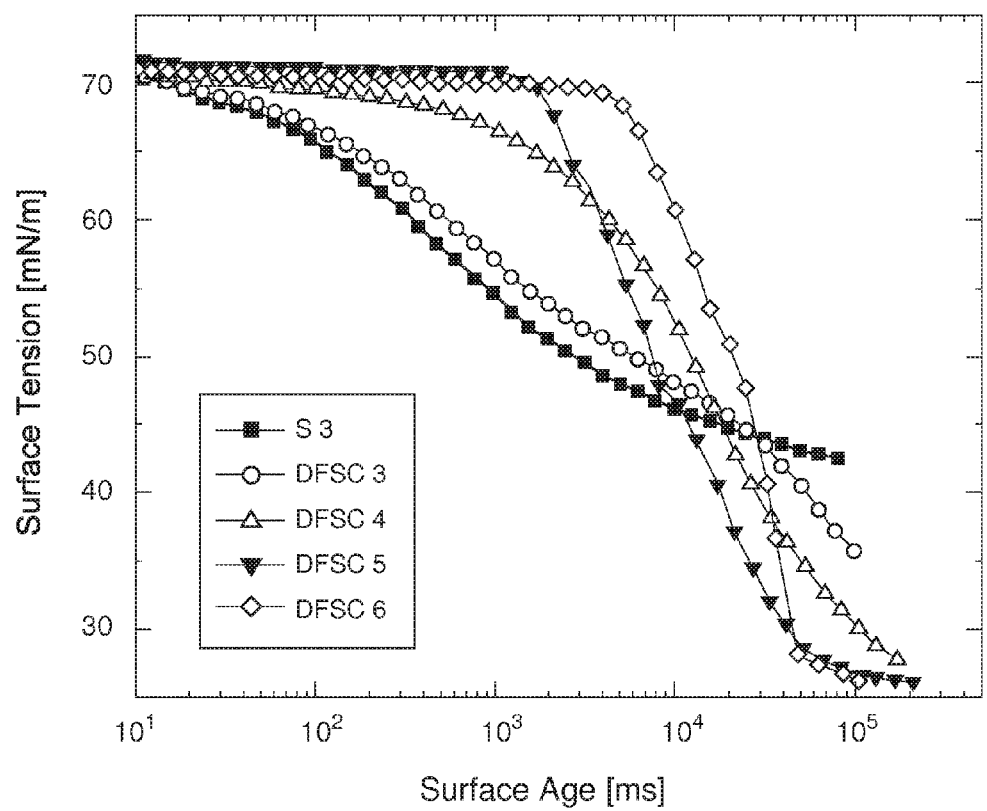
FIG. 5 is a graph illustrating dynamic surface tension data of certain solutions according to embodiments of the present disclosure.

Dynamic surface tension tests similar to those described in Example 1 were performed on a solution of a DDBSA anionic surfactant (sample S3) as well as a series of solutions of MSCs of that anionic surfactant with different concentrations of a dodecyl trimethyl ammonium chloride (C-12 TMAC) cationic polymeric clay stabilizer additive (samples MSC3, MSC4, MSC5, and MSC6). FIG. 5 is a dynamic surface tension plot illustrating this data over time. As shown in FIG. 5, similar to the solutions tested in Example 1A, the dynamic surface tension of the solutions containing MSCs maintained a high surface tension for a longer period of time and initially decreased less rapidly than the corresponding solution of the surfactant alone, indicating a lower diffusion rate of the surfactant. As shown in FIG. 5, solutions comprising the MSCs exhibit a further reduced surface tension of the solution (i.e., below that of the solution with surfactant alone) after all of the surfactant was released, which is a result of the oppositely-charged polymeric additive in those solutions released from the MSCs.

The data from Examples 1A and 1B demonstrates that, in certain embodiments where these MSCs of the present disclosure are included in an aqueous fluid that is pumped into a well, the surfactant in the MSC may remain in solution for a longer period of time than a solution of the corresponding surfactant alone, instead of adsorbing onto proppants, well bore equipment, or other surfaces in the subterranean formation or well bore. Moreover, it is noted that, for the surfactant in samples MSC1 and S1, the surface tension of the solution with MSCs eventually reaches the same value as the solution without MSCs, indicating that the entire surface is occupied by surfactant released from the MSCs.

Example 2

Figure 6A:
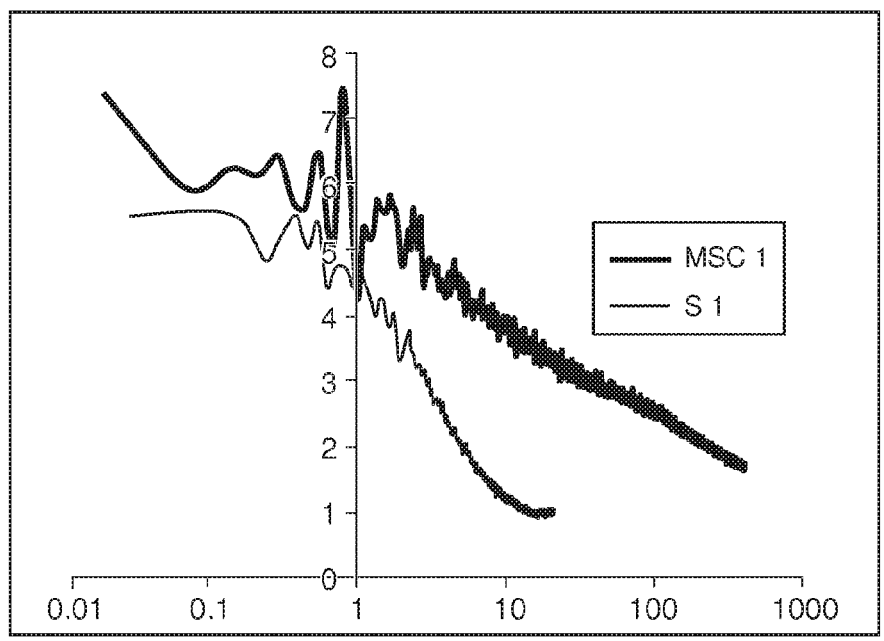
FIGS. 6A and 6B are graphs illustrating interfacial tension data of certain solutions according to embodiments of the present disclosure.
Figure 6B:
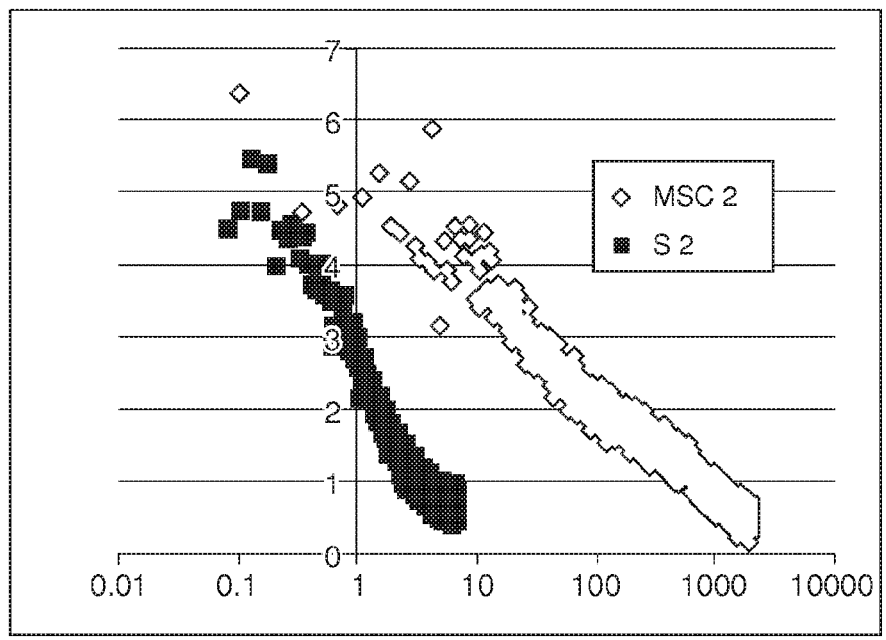

Dynamic interfacial tension tests were also performed to determine how the MSCs of the present disclosure impact the surface tension of the associated surfactants at the oil-water interface. In these tests, a fresh oil droplet was created in a U-shaped needle and an aqueous continuous phase. The dynamic interfacial tension was obtained from the pendant shape of the drop using the Young-Laplace equation. Aqueous solutions of two different anionic surfactants were tested in this manner, both in samples with the surfactants alone (samples S1 and S2) and samples with the surfactants associated with multi-functional surfactant complexes (samples MSC1 and MSC2). FIGS. 6A and 6B are interfacial tension plots illustrating this data over time for S1/MSC1 and S2/MSC2, respectively. As shown in FIGS. 6A and 6B, the interfacial tension decay rate for the solutions of surfactants alone was higher than that of the solutions containing MSCs, and the interfacial tension of the solutions containing surfactants alone began to decay sooner than in the solutions containing MSCs. This data demonstrates that, in certain embodiments where these MSCs of the present disclosure are included in an aqueous fluid that is pumped into an oil reservoir, once pumping is stopped, the surfactant molecules will still reach out to oil molecules in contact with the aqueous fluid and the surfactant inventory in the aqueous fluid will not deplete with time.

Example 3

Figure 7:
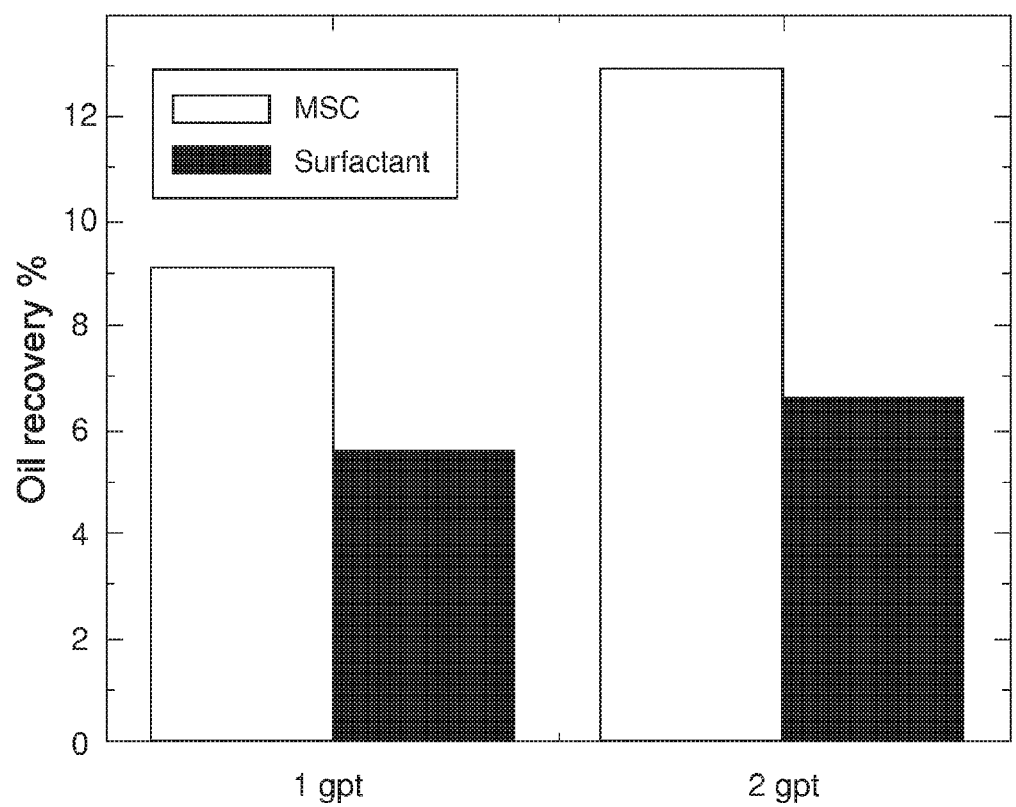
FIG. 7 is a bar graph illustrating oil recovery data in tests of certain solutions according to embodiments of the present disclosure.

Oil recovery tests were also performed using an aqueous solution of an anionic surfactant (comprising a blend of DDBSA and ethoxylated surfactants) and an aqueous solution of a corresponding MSC of that anionic surfactant with a poly-DADMAC cationic polymer. Concentrations of 1 gallon per thousand gallons (gpt) and 2 gpt of each type of solution were tested (the concentration referring to the surfactant or the MSC). Each solution was pumped into an high-performance liquid chromatography (HPLC) column packed with 100 mesh core powders that had been aged with crude oil at reservoir temperature for two days. The solutions were injected at a fixed flow rate of 3 ml/hr. The second pass of the effluent solution was analyzed using an InfraCal analyzer (available from Spectro Scientific of Chelmsford, Mass.) to determine the oil recovery. The percentage of oil recovered in each of these tests was recorded and is shown in FIG. 7. As shown, the solutions of MSCs generally achieved increased oil recovery as compared to the corresponding solutions of the surfactant alone.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. While numerous changes may be made by those skilled in the art, such changes are encompassed within the spirit of the subject matter defined by the appended claims. Furthermore, no limitations are intended to the details of construction or design herein shown, other than as described in the claims below. It is therefore evident that the particular illustrative embodiments disclosed above may be altered or modified and all such variations are considered within the scope and spirit of the present disclosure. In particular, every range of values (e.g., "from about a to about b," or, equivalently, "from approximately a to b," or, equivalently, "from approximately a-b") disclosed herein is to be understood as referring to the power set (the set of all subsets) of the respective range of values. The terms in the claims have their plain, ordinary meaning unless otherwise explicitly and clearly defined by the patentee.

What is claimed is:

1. A method comprising:
providing a first solution comprising at least one surfactant and a second solution comprising at least one polymeric additive, wherein the surfactant and the polymeric additive carry opposite charges;
using a stop-flow mixing apparatus at a well site to mix the first and second solutions to form one or more multi-functional surfactant complexes that comprise the surfactant and the polymeric additive;
using a low-dose pumping apparatus at the well site to transfer the one or more multi-functional surfactant complexes from the stop-flow mixing apparatus to a blending apparatus at the well site, wherein the low-dose pumping apparatus is capable of transferring a fluid to the blending apparatus at a rate of less than 1 gallon per thousand gallons of fluid mixed in the blending apparatus;
using the blending apparatus to mix the one or more multi-functional surfactant complexes with an aqueous base fluid to form a treatment fluid; and
introducing the treatment fluid into a well bore at the well site penetrating at least a portion of a subterranean formation.

2. The method of claim 1 wherein the treatment fluid is a fracturing fluid, and the fracturing fluid is introduced into the well bore at a pressure sufficient to create or enhance one or more fractures within the subterranean formation.

3. The method of claim 1 wherein:
the stop-flow mixing apparatus comprises an observation cell into which the first and second solutions flow after mixing, and a measurement device configured to monitor the contents of the observation cell, and the method further comprises using the measurement device to confirm the presence of one or more multi-functional surfactant complexes in the observation cell.

4. The method of claim 3 wherein:
the stop-flow mixing apparatus further comprises a stopping syringe in fluid communication with the observation cell; and
the method further comprises using the stopping syringe to stop the flow of the first and second solutions into the observation cell at a predetermined volume.

5. The method of claim 3 wherein the measurement device comprises a UV-visible spectrometer.

6. The method of claim 1 further comprising using the blending apparatus to mix a plurality of proppant particulates with the one or more multi-functional surfactant complexes and the aqueous base fluid to form the treatment fluid.

7. The method of claim 1 wherein the blending apparatus comprises a pump and blending system, and the treatment fluid is introduced into the well bore using the pump and blending system.

8. The method of claim 1 wherein the surfactant comprises at least one surfactant selected from the group consisting of: a sodium, potassium, or ammonium salt of a long chain alkyl sulfonate; a sodium, potassium, or ammonium salt of a long chain alkyl aryl sulfonate; a dialkyl sodium sulfosuccinate; an alkyl sulfate; an alkyl sulfonate; an alkoxylated sulfate; an ethoxylated alcohol; a polyglucoside; an ethoxylated long-chain alcohol; an alkyl ammonium bromide; a hydroxysultaine; and any combination thereof.

9. The method of claim 1 wherein the polymeric additive comprises at least one polymeric additive selected from the group consisting of: a friction reducer; a clay stabilizer; a biocide; a corrosion inhibitor; a scale inhibitor; and any combination thereof.

10. The method of claim 1 wherein the polymeric additive comprises a clay stabilizer.

11. The method of claim 1 wherein the polymeric additive is cationic and the surfactant is anionic.

12. The method of claim 1 wherein the treatment fluid further comprises one or more salts.

13. The method of claim 1 wherein the treatment fluid further comprises one or more additional surfactants.

* * * * *